Oct. 21, 1941.  S. A. STEVENS ET AL  2,259,711
ALTERNATING ELECTRIC CURRENT CONTROL APPARATUS
Filed Dec. 4, 1940  2 Sheets-Sheet 2

INVENTORS
Sydney Arthur Stevens &
Alec Hervey Bennett Walker.
THEIR ATTORNEY

Patented Oct. 21, 1941

2,259,711

UNITED STATES PATENT OFFICE 2,259,711

ALTERNATING ELECTRIC CURRENT CONTROL APPARATUS

Sydney Arthur Stevens and Alec Hervey Bennett Walker, London, England, assignors, by mesne assignments, to The Union Switch & Signal Company, Swissvale, Pa., a corporation of Pennsylvania Application December 4, 1940, Serial No. 368,498
In Great Britain October 23, 1939

3 Claims. (Cl. 179—171)

This invention relates to alternating electric current control apparatus of the magnetic amplifier type comprising a reactance winding included in the alternating current circuit to be controlled and provided with a magnetic core adapted to be magnetically saturated by means of a saturation winding to which a relatively small control power is supplied, the magnetic permeability of the core being thereby varied in such a manner as to effect a corresponding but amplified variation in the alternating power controlled by the reactance winding.

In order to produce the amplification above referred to it has previously been proposed to cause the magnetic saturation of the amplifier core to be automatically varied in accordance with the variation in the alternating current due to the action of the saturation winding so as to obtain a feed-back or regenerative effect in operation, and the present invention has for its object to provide improved apparatus in which a relatively high degree of amplification, that is to say, a high ratio between the variation effected in the power to be controlled for a given variation in the control power supplied to the saturation winding can be obtained.

A further object of the invention is to enable the extent of the regenerative action to be controlled so as to permit the amplification obtained to be varied with a view of obtaining the maximum degree of amplification possible under conditions of stability or even to render the operation of the apparatus unstable for certain purposes as hereinafter explained.

According to the present invention the amplifier apparatus comprises essentially two reactance windings provided with magnetic cores and connected in parallel with one another in the alternating current circuit to be controlled, a rectified current derived from the circuit to be controlled through a series or current transformer being caused to traverse the reactance windings in series with one another while the magnetic cores are provided with a saturation winding or windings traversed by the control current so as correspondingly to vary the magnetic permeability of the cores.

The invention is illustrated by way of example in the accompanying drawings, Figures 1, 2, 3 and 4 of which are diagrammatic views of the circuit connections of various forms of apparatus embodying the invention.

Figure 1:
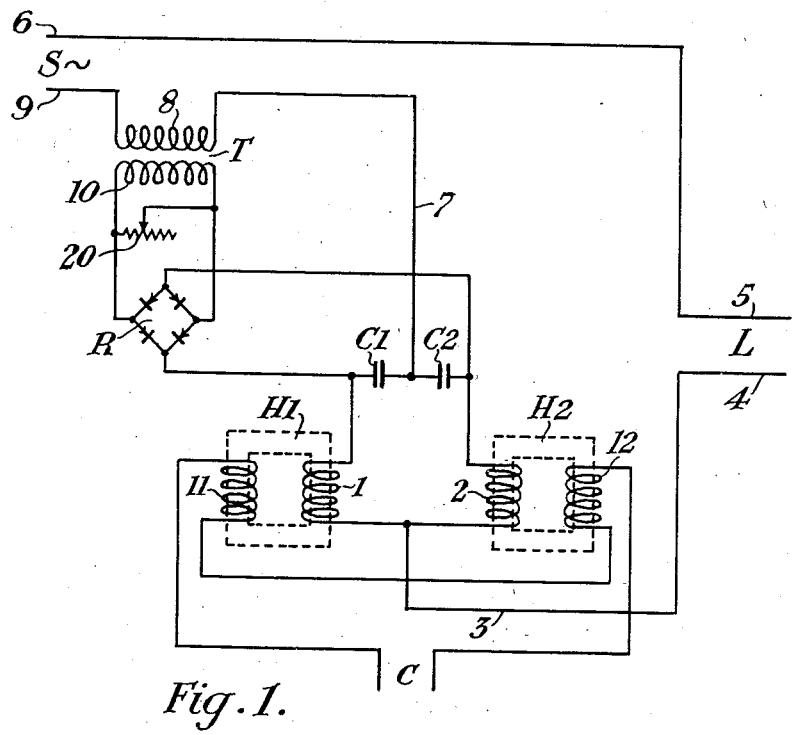

Referring now first to Figure 1, it will be seen that the amplifier apparatus therein illustrated comprises a pair of closed magnetic cores $H_1$, $H_2$, each provided with a reactance winding $1$, $2$ respectively, one terminal of each of the windings $1$, $2$, being connected to one terminal $4$ of a load circuit L to be controlled, the other terminal $5$ of this load circuit being connected to one terminal $6$ of the source of alternating current S from which the load circuit L is supplied. The other terminals of the reactance windings $1$, $2$ are each connected through a condenser $C^1$, $C^2$, to a conductor $7$ which is connected in series with the primary winding $8$ of a current transformer T to the other terminal $9$ of the source of alternating current S.

The secondary winding $10$ of the current transformer T is connected to the input terminals of a full-wave rectifier system R comprising bridge-connected dry surface contact rectifiers of the well known type, the output terminals of the rectifier system being connected to those terminals of the reactance windings $1$, $2$, connected to the condensers $C^1$, $C^2$.

Each of the magnetic cores $H_1$, $H_2$, of the amplifier is also provided with a saturation winding $11$, $12$ respectively, connected to a control circuit C so as to be traversed by the control current which may be direct, rectified or low-frequency alternating current.

In operation it will be understood that by increasing the control current traversing the saturation windings $11$, $12$, the magnetic saturation of the cores $H_1$, $H_2$, is increased so as correspondingly to decrease their magnetic permeability. The choke coil effect of the windings $1$, $2$, is therefore reduced and the alternating current traversing the windings $1$, $2$, and the load circuit L is thereby increased. This increase in current effects a corresponding increase in the current supplied to the input terminals of the rectifier system R through the current transformer T which in turn increases the current supplied from the output terminals of the rectifier system R to the circuit including the reactance windings $1$, $2$, in series with one another. As a result the magnetic saturation of the amplifier cores $H_1$, $H_2$, is still further increased and owing to the decreased permeability the current traversing the load circuit L is further increased.

The extent of the feed-back or regenerative action above described can evidently be adjusted by providing the current transformer with arrangements for varying the transformation ratio or by providing a variable resistance connected in parallel with the primary or secondary windings $8$, $10$, of the transformer T. As shown in Figure 1 an adjustable resistance $20$ is provided connected in parallel with the winding 10.

Figure 2:
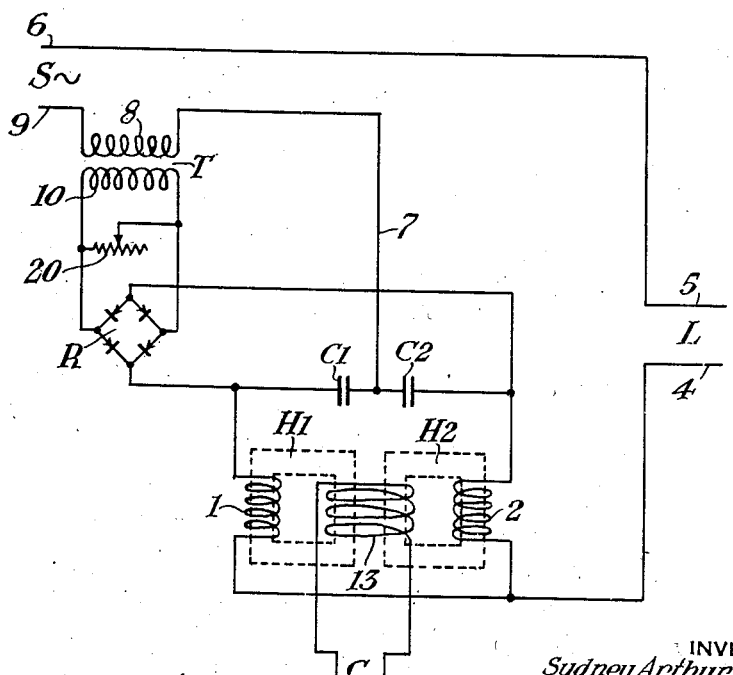

In the modified form of the apparatus shown in Figure 2, the saturation windings 11, 12 of the apparatus of Figure 1 are replaced by a single saturation winding 13 surrounding both the cores $H_1$, $H_2$, the arrangement and operation of the apparatus being otherwise the same as that already described.

Figure 3:
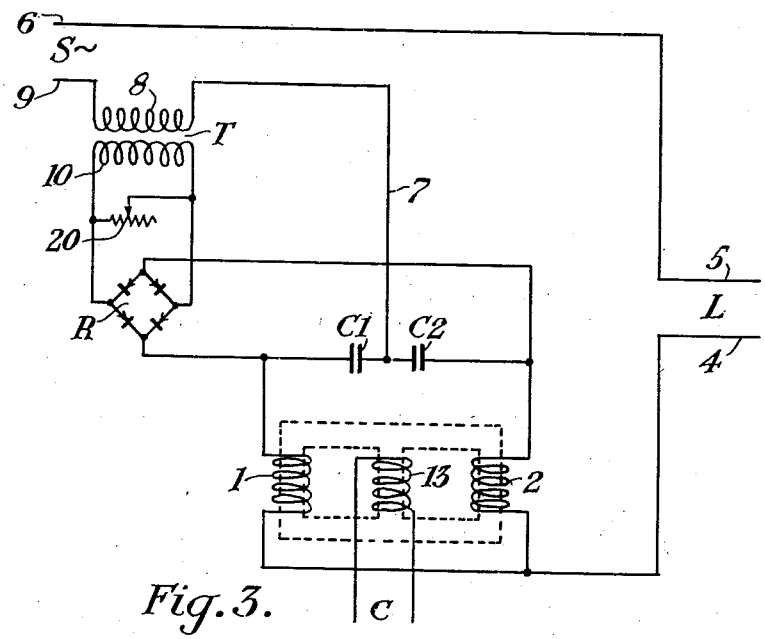

In the further modification illustrated in Figure 3, a single magnetic core H is substituted for the cores $H_1$ and $H_2$, of the apparatus of Figure 2, the arrangement and operation of the apparatus being otherwise substantially the same.

Figure 4:
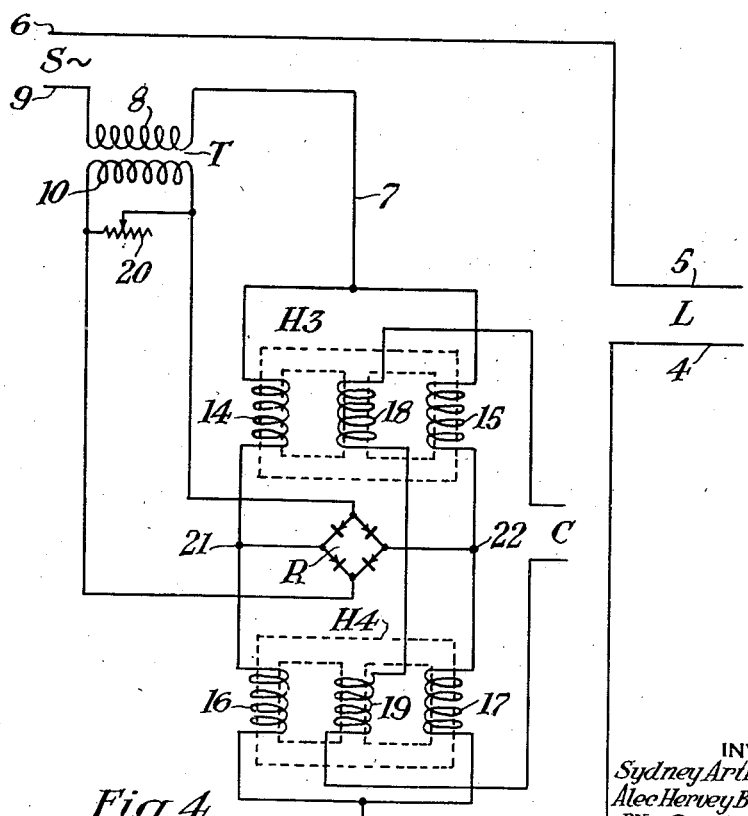

In the still further modification shown in Figure 4, two separate magnetic cores $H_3$ and $H_4$ are provided, each of these cores having three limbs. The core $H_3$ is provided with reactance windings 14, 15, the core $H_4$ being similarly provided with reactance windings 16, 17. The windings 14, 16 are connected in series in the load circuits between the terminal 4 and the conductor 7 the windings 15, 17 being similarly connected in parallel with the series connected windings 14, 16.

The cores $H_3$ and $H_4$ are provided with saturation windings 18, 19 respectively connected in series in the control circuit C and the output terminals of the rectifier R are connected to the points 21, 22 intermediate the series connected windings 14, 16 and 15, 17 respectively. The input terminals of the rectifier R are connected to the secondary winding 10 of the transformer T as in the previous forms of apparatus but it will be observed that the condensers $C^1$, $C^2$ are dispensed with in the apparatus of Figure 4. The operation of this form of apparatus is similar to that of Figure 3 with the exception that the rectified current supplied from the rectifier R traverses two circuits in parallel with each other, viz., a circuit including the reactance windings 14 and 15 in series and another circuit including the reactance windings 16, 17, in series.

Two or more amplifiers may be connected in cascade for obtaining a greater degree of amplification as will be readily understood.

The amplifier apparatus of the invention may evidently be employed as a relay if desired, the choke coil effect of the reactance windings preventing any effective current traversing the circuit to be controlled so long as the control circuit including the saturation winding or windings is de-energized, while when the control circuit is energized by a relatively small current, the current traversing the circuit to be controlled is greatly increased so that an effective relay action is obtained without the necessity for any moving elements.

The invention is evidently not limited to the particular arrangements and connections above described and illustrated by way of example which may be varied in many respects without exceeding the scope of the invention.

Having now described our invention, what we claim as new and desire to secure by Letters Patent is:

1. Magnetic amplifier apparatus of the kind described comprising in combination with a source of alternating current and a load supplied with current from said source, a saturable magnetic core having a pair of reactance windings connected in parallel with one another and included in the load circuit, a saturation control winding on said core, means for energizing said saturation control winding to increase the saturation of said magnetic core and thereby increase the current supplied to said load from said source, a current transformer having its input winding included in said load circuit, and means including a rectifier for supplying unidirectional current from the output winding of said transformer to said reactance windings, whereby when the load current is increased the saturation of said magnetic core is further increased to provide regenerative operation of said magnetic amplifier apparatus.

2. Magnetic amplifier apparatus of the kind described comprising in combination with a source of alternating current and a load supplied with current from said source, a saturable magnetic core device having a pair of reactance windings connected in parallel with one another and included in said load circuit, a saturation control winding on said magnetic core device, means for energizing said saturation control winding to increase the saturation of said magnetic core device and thereby increase the current supplied to said load from said source, a current transformer having its input winding included in said load circuit, and means including a rectifier for impressing a unidirectional potential from the output winding of said transformer across said two reactance windings in series, whereby when the load current is increased the saturation of said magnetic core device is further increased to provide regenerative operation of said magnetic amplifier apparatus.

3. Magnetic amplifier apparatus of the kind described comprising in combination with a source of alternating current and a load supplied with current from said source, a saturable magnetic core device having a pair of reactance windings connected in parallel with one another and included in said load circuit, a saturation control winding on said magnetic core device, means for energizing said saturation control winding to increase the saturation of said magnetic core device and thereby increase the current supplied to said load from said source, means included in said load circuit for establishing a potential in accordance with the magnitude of the current supplied to said load, means for rectifying said potential, and means for impressing said rectified potential across said two reactance windings in series, whereby when the load current is increased the saturation of said magnetic core device is further increased to provide regenerative operation of said magnetic amplifier apparatus.

SYDNEY ARTHUR STEVENS.
ALEC HERVEY BENNETT WALKER.